May 19, 1931.   A. B. McKAY   1,805,589
DIRIGIBLE HEADLIGHT
Filed Feb. 7, 1929   2 Sheets-Sheet 1
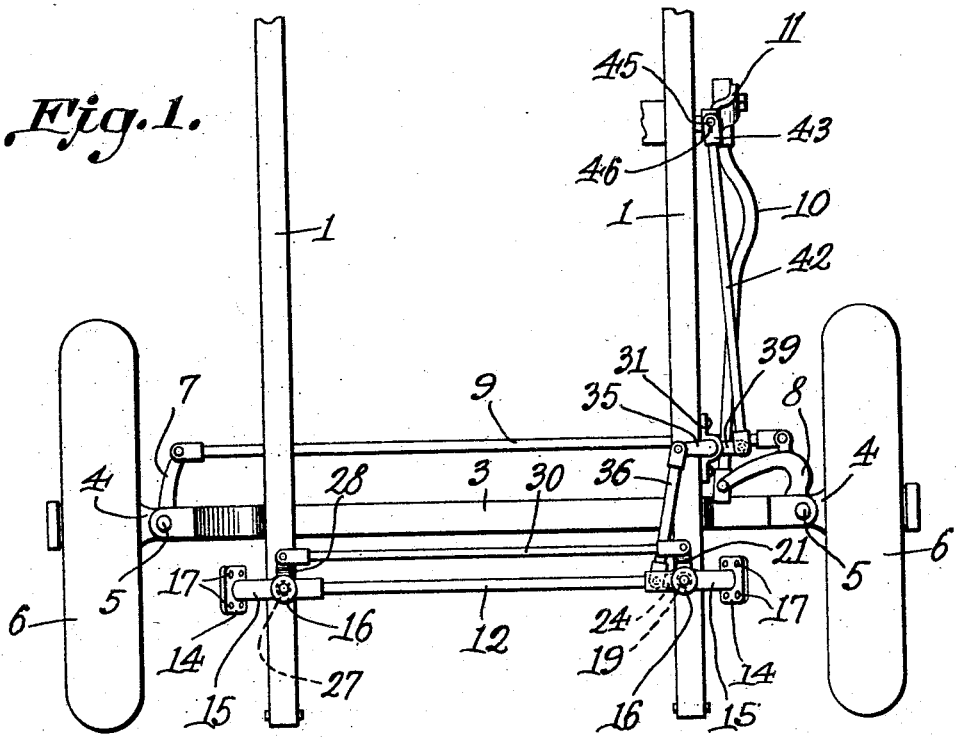
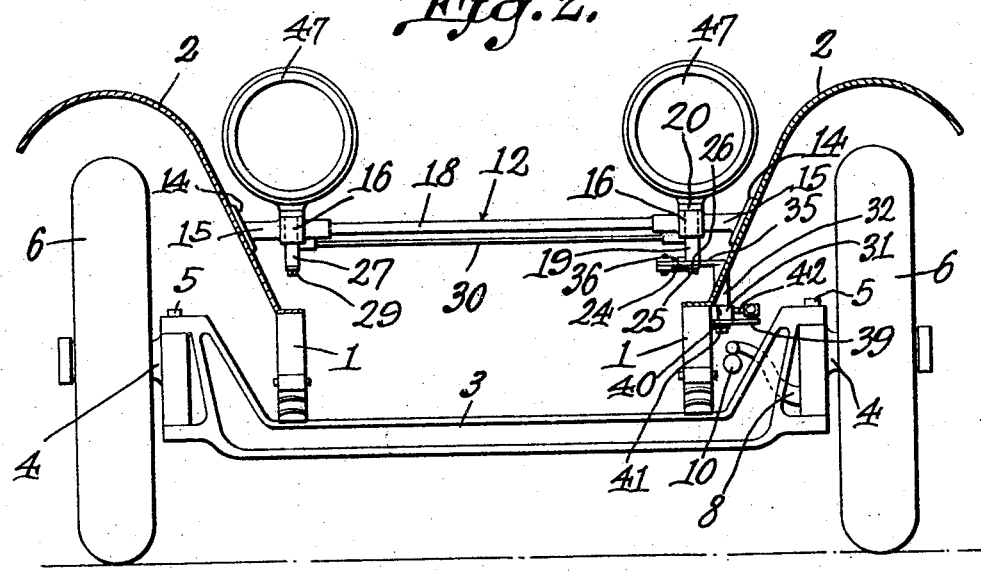
A. B. McKay, Inventor May 19, 1931. A. B. McKAY 1,805,589
DIRIGIBLE HEADLIGHT
Filed Feb. 7, 1929 2 Sheets-Sheet 2
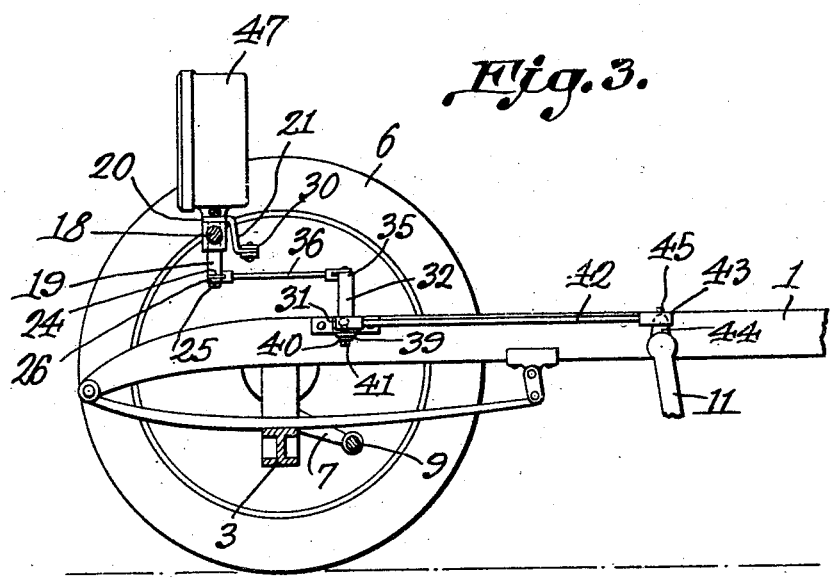
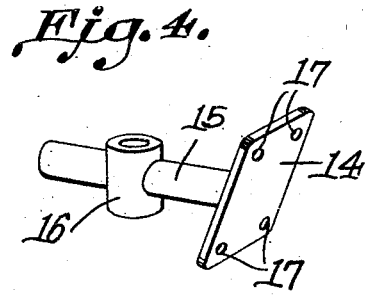
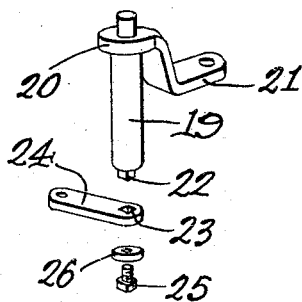

Patented May 19, 1931

1,805,589

UNITED STATES PATENT OFFICE

ARCHIE BAWLIN McKAY, OF NEW LONDON, CONNECTICUT

DIRIGIBLE HEADLIGHT

Application filed February 7, 1929. Serial No. 338,284.

This invention aims to provide a novel means whereby when the wheels of a vehicle are inclined laterally to effect a steering of the vehicle, the headlights of the vehicle will be turned accordingly. Especially, the invention aims to provide a device of the class described in which the lights will throw their beams ahead along the road when a corner is turned. Another object of the invention is to provide novel means whereby the lamps may be connected operatively with the steering mechanism of the vehicle.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a portion of a motor propelled vehicle on which the device forming the subject matter of this application has been mounted;

Figure 2 is a front elevation, the fenders being in section;

Figure 3 is a side elevation;

Figure 4 is a perspective view showing a part of the support for the lamps;

Figure 5 is a perspective view showing one of the lamp shafts and attendant parts;

Figure 6 is a perspective view showing another of the shafts and parts associated therewith.

The numeral 1 marks the frame of a vehicle, including front fenders 2. The forward axle is marked by the numeral 3. The movable axle ends are shown at 4 and are pivoted at 5 upon the axle 3. The forward wheels are designated by the numeral 6 and are journaled on the axle ends 4. One of the axle ends 4 has a rearwardly extended arm 7, and the other axle end has a rearwardly and inwardly extended arm 8. A connecting rod 9 is pivoted to the arms 7 and 8. A link 10 is pivoted to the arm 8 for universal movement, and is pivoted to a radius arm 11, forming part of the steering mechanism, and mounted to swing in the frame 1.

The construction hereinbefore described is common and no novelty is claimed for it, saving in so far as it may enter into combination with parts hereinafter described. It is with a structure of the kind set forth, or with a similar structure, that the device forming the subject matter of this application is adapted to be used.

A support 12 is mounted on the fenders 2. The support 12 is a composite structure including foot plates 14 carrying inwardly projecting sockets 15 having vertical bearings 16, there being openings 17 in the foot plates 14, the openings being adapted to receive securing elements that attach the foot plates to the inner surfaces of the fenders 2, in coaxial relation. In the inner ends of the sockets 15 is secured a bar 18. In the bearing 16, at one side of the vehicle, is journaled a shaft 19 having a head 20 that limits the downward movement of the shaft 19. The head 20 carries a rearwardly extended and downwardly inclined bracket 21. The shaft 19 is provided at its lower end with a squared boss 22 received in a correspondingly shaped hole 23 in an arm 24. A securing element 25, such as a screw, is provided and carries a washer 26. The washer 26 engages the lower surface of the arm 24 and holds it on the squared boss 22 of the shaft 19, the securing element or screw 25 passing upwardly into the boss 22 and holding the arm 24 thereon, with the boss 22 received in the squared hole 23.

The arm 24 extends inwardly, as shown in dotted lines in Figure 1. A shaft 27, similar to the shaft 19, is journaled in one of the bearings 16 and has a rearwardly and downwardly inclined bracket 28. The shaft 27 may be finished off at its lower end with a nut and washer 29, for the sake of appearance, so that this shaft will look like the shaft 19. A connection 30, in the form of a rod, is pivoted to the rear end of the bracket 28 and to the rear end of the bracket 21.

A bearing 31 is secured to the outer surface of one of the frame bars 1. The numeral 32 designates a shaft, having a reduced lower end 33 defining a shoulder 34. The end 33 of the shaft 32 is journaled in the bearing 31, and the shoulder 34 rests on the upper end of said bearing. At its upper end, the shaft 32 has an arm 35 that extends inwardly. A connecting rod 36 is pivoted to the arm 35 of the shaft 32 and to the arm 24 that is secured to the lower end of the shaft 19.

The reduced end 33 of the shaft 32 has a squared boss 37, received in a correspondingly shaped opening 38 fashioned in an outwardly extended arm 39, the arm 39 being held on the boss 37 by means of a washer 40 and a screw 41, the screw extending upwardly into the boss 37 and into the lower end 33 of the shaft 32. To the outer end of the arm 39 is pivoted a link 42, the link having a compound movement, both horizontally and vertically.

On the rear end of the link 42 there is an enlargement 43 having a socket in which is received for rocking movement, a finger 44 on the upper end of the radius arm 11, the finger 44 having a reduced extension 45 which passes upwardly through an opening 46 in upper surface of the enlargement 43 on the link 42.

In practical operation, when the reduced arm 11 is swung vertically, to effect the steering of the vehicle, the finger 44 on the radius arm 11 will impart longitudinal movement to the link 42. From the link 42 motion is imparted to the shaft 32 by way of the arm 39, and the arm 35 on the shaft 32 actuates the rod 36. The rod 36 cooperates with the arm 24 on the lower end of the shaft 19, to rock that shaft, and the bracket 21 transmits motion to the connection 30, the connection 30 cooperating with the bracket 28 to rotate the shaft 27. When the shafts 27 and 19 are rotated, the lamps 47, which are secured to the heads 20 of the said shafts, will be turned in the direction in which the vehicle is moving, as it rounds a corner, or follows the curves of a road.

Having thus described the invention, what is claimed is:—

The combination with the fenders and chassis bars of a vehicle, of a support extended between and connecting the fenders, vertical lamp shafts journaled in the support, a lamp carried by each lamp shaft, an inwardly extended arm on the lower end of one lamp shaft and located directly beneath the support, rearwardly extended brackets secured to the lamp shafts and located immediately above the chassis bars, the chassis bars extending outwardly beyond the brackets, a connecting rod pivoted to the brackets, a second vertical shaft journaled on the outer side of one chassis bar and provided at its upper end with an inwardly extended arm located above the said chassis bar, a second connecting rod pivoted to the last-specified arm at a point spaced inwardly from the outer edge of said chassis bar, the second connecting rod being inwardly inclined, said chassis bar extending outwardly beyond all portions of the second connecting rod, the second connecting rod being pivoted to the first-specified arm at a point immediately below the support, and means connecting the lower end of the second-mentioned shaft to a part of the steering mechanism of the vehicle.

In testimony that I claim the foregoing as my own, I have hereto affixed my signature.

ARCHIE BAWLIN McKAY.